United States Patent
Guo et al.

(10) Patent No.: US 7,813,083 B2
(45) Date of Patent: Oct. 12, 2010

(54) DISK DRIVE LOAD ARM STRUCTURE HAVING A STRAIN SENSOR AND METHOD OF ITS FABRICATION

(75) Inventors: Wei Guo, Fremont, CA (US); Yanchu Xu, San Jose, CA (US); Jifang Tian, Fremont, CA (US)

(73) Assignee: Maxtor Corporation, Scotts Valley, CA (US)

( * ) Notice: Subject to any disclaimer, the term of this patent is extended or adjusted under 35 U.S.C. 154(b) by 813 days.

(21) Appl. No.: 11/654,480

(22) Filed: Jan. 17, 2007

(65) Prior Publication Data

US 2007/0178746 A1 Aug. 2, 2007

Related U.S. Application Data

(60) Provisional application No. 60/759,808, filed on Jan. 18, 2006.

(51) Int. Cl.
 *G11B 21/02* (2006.01)
(52) U.S. Cl. .................................................. 360/245.9
(58) Field of Classification Search .................... None
 See application file for complete search history.

(56) References Cited

U.S. PATENT DOCUMENTS

| | | | |
|---|---|---|---|
| 5,455,727 A | 10/1995 | Baral et al. | |
| 5,702,629 A | 12/1997 | Cui et al. | |
| 5,862,015 A | 1/1999 | Evans et al. | |
| 5,915,267 A | 6/1999 | Kim | |
| 6,064,540 A | 5/2000 | Huang et al. | |
| 6,310,746 B1 | 10/2001 | Hawwa et al. | |
| 6,501,625 B1 * | 12/2002 | Boismier et al. | 360/294.7 |
| 6,661,619 B2 * | 12/2003 | Nishida et al. | 360/294.4 |
| 6,697,225 B2 | 2/2004 | Wittig et al. | |
| 6,731,472 B2 * | 5/2004 | Okamoto et al. | 360/294.3 |
| 6,738,229 B2 | 5/2004 | Williams | |
| 6,771,454 B2 | 8/2004 | White et al. | |
| 6,859,345 B2 | 2/2005 | Boutashou et al. | |
| 6,861,854 B1 | 3/2005 | Guo et al. | |
| 6,867,949 B1 | 3/2005 | Guo et al. | |
| 6,885,525 B1 * | 4/2005 | Utsunomiya | 360/294.4 |
| 6,938,326 B1 | 9/2005 | Chen et al. | |
| 6,975,477 B1 | 12/2005 | Hu et al. | |
| 6,975,481 B1 | 12/2005 | Oswald et al. | |
| 6,977,790 B1 | 12/2005 | Chen et al. | |
| 7,000,459 B2 | 2/2006 | Riddering et al. | |
| 7,016,159 B1 * | 3/2006 | Bjorstrom et al. | 360/294.6 |
| 7,023,665 B2 | 4/2006 | Riener | |
| 7,024,754 B1 | 4/2006 | Crowder et al. | |
| 7,035,041 B1 | 4/2006 | Guo et al. | |

(Continued)

*Primary Examiner*—Mark Blouin
(74) *Attorney, Agent, or Firm*—Fellers, Snider, et al.

(57) ABSTRACT

A load arm for a disk drive may include a base section that has an opening for receiving a spindle of a voice coil motor. The base section may have hinge arms that extend from the base section and terminate in tab portions. An arm section may be affixed to the tabs of the hinge arms of the base section such as by spot welding. A head suspension assembly may be affixed to a distal end of the arm section such as by spot welding. A sensor may be provided on a hinge arm of the base section. The sensor may comprise a piezoelectric polymer sensing element and an electrode formed over the piezoelectric polymer sensing element.

19 Claims, 6 Drawing Sheets

U.S. PATENT DOCUMENTS

| | | |
|---|---|---|
| 7,038,886 B1 | 5/2006 | Chang et al. |
| 7,082,670 B2 * | 8/2006 | Boismier et al. ......... 29/603.06 |
| 7,110,224 B2 * | 9/2006 | Nakamura et al. ....... 360/294.1 |
| 7,280,319 B1 * | 10/2007 | McNab .................... 360/294.4 |
| 7,538,985 B2 * | 5/2009 | Utsunomiya ............. 360/294.4 |
| RE40,975 E * | 11/2009 | Evans et al. .............. 360/244.1 |

* cited by examiner

DISK DRIVE LOAD ARM STRUCTURE HAVING A STRAIN SENSOR AND METHOD OF ITS FABRICATION

RELATED APPLICATIONS

This application claims priority from U.S. Provisional Patent Application 60/759,808, filed Jan. 18, 2006, the entirety of which is incorporated herein by reference.

BACKGROUND

1. Field of the Invention

Embodiments relate to hard disk drives, and specifically to a suspension assembly for supporting the moveable head of a hard disk drive.

2. Related Art

Disk drive storage systems typically include a plurality of magnetic storage medium disks stacked on a rotatable spindle and a corresponding number of magnetic heads that read binary digital information from and write binary digital information to the disks. The heads are typically supported by an actuator assembly. The actuator assembly normally includes a voice coil motor that causes pivotal motion of an actuator arm about an axis. A load beam is attached to the actuator arm and extends outward from the actuator arm over a disk surface. The load beam typically includes a base section that is affixed to the actuator arm, a hinge region integral with and extending from the base section, a rigid region integral with and extending from the hinge region, and a head suspension assembly affixed to a distal end of the rigid region. The head suspension assembly is comprised of a head slider containing the read and write heads, and a head suspension that uses a spring or gimbal structure to support the head slider in a manner that allows the head slider to move in pitch and roll directions relative to the disk surface. The head slider has an aerodynamic design that causes the head slider to fly over the surface of the rotating disk while supported on an air bearing generated by the rotating disk. A microactuator may be provided between the load beam and the head suspension assembly to provide additional control of the position of the head over the disk.

The position of the head over the disk is controlled using a servo control feedback loop. The control loop receives a reference signal that indicates the desired position for the head over the disk. This signal is combined with a position signal generated by the head that indicates the actual position of the head over the disk. A position error signal that indicates the distance between the desired position and the actual position is generated. Based on the position error signal, a controller in the control loop issues control signals to the voice coil motor and microactuator to move the head toward the desired position.

Load beams and head suspension assemblies can experience deformations that increase track misalignment range (TMR). One source of deformations is the load beam's tendency to bend and twist in a number of different modes, known as resonant frequencies, when driven back and forth at certain rates. The three primary modes are known as the sway, first torsion, and second torsion modes. The sway mode is a lateral bending mode in which the suspension bends in a transverse direction along its entire length. The first and second torsion modes are twisting modes during which the suspension twists about a rotational axis which extends along the length of the suspension. Another source of deformations is windage, which is movement of the load beam or head suspension assembly due to airflow forces. Deformations can also be caused by movement of the microactuator.

To prevent off-track head motion caused by these forces, the prior art devices have placed sensors on the actuator assembly to sense deformations and supply signals to the control loop. U.S. Pat. No. 5,862,015 shows a sensor provided on a load beam that detects strain in the actuator assembly caused by movement of the head relative to the actuator arm. U.S. Pat. No. 6,771,454 describes a control system that minimizes off-track motion due to resonant modes by sensing movement with a sensor provided on a load beam. The sensor can be one of many types, such as a pressure sensor, capacitive plate position sensor, Micro Electro Mechanical System (MEMS) accelerometer, MEMS-based piezo-resistive sensor, and polyvinylidene fluoride (PVDF) film sensor.

As performance and resonant frequency requirements have become more stringent, load beam designs have become more complex, as have the methods of forming the load beams. U.S. Pat. No. 6,938,326, describes a method of forming a load beam in which the hinge region of the load beam is comprised of two arms separated by an opening, and the spring rate of the hinge region is controlled by etching to adjust the thickness of its arms relative to the remainder of the load beam. The rigid section of the load beam is provided with bent edge portions, referred to as rails, that maintain the rigidity of the structure.

SUMMARY

A load arm for a disk drive may include a base section that has an opening for receiving a spindle of a voice coil motor. The base section may have hinge arms that extend from the base section and terminate in tab portions. An arm section may be affixed to the tabs of the hinge arms of the base section such as by spot welding. A head suspension assembly may be affixed to a distal end of the arm section such as by spot welding. A sensor may be provided on a hinge arm of the base section. The sensor may comprise a piezoelectric polymer sensing element and an electrode formed over the piezoelectric polymer sensing element. Another sensor may be provided on the arm section of the load beam. This sensor may also comprise a piezoelectric polymer sensing element and an electrode formed over the piezoelectric polymer sensing element.

A load beam may be formed by laminating a piezoelectric polymer film such as a polyvinylidene fluoride (PVDF) film to the surface of a sheet of a structural material such as steel. Sensors may then be formed on the substrate. Sensors may be formed by forming electrodes on the piezoelectric polymer film, such as by printing a conductive ink on the piezoelectric polymer film, and then removing portions of the piezoelectric polymer film that do not underlie that electrodes, such as by etching to remove portions of the piezoelectric polymer film using the electrodes as etch masks. The resulting sensors comprise electrodes overlying portions of the piezoelectric polymer film. Base sections may then be formed from the substrate. Base sections may be formed by masking the sensors and portions of the substrate with a mask that defines the shape of a base section, such that hinge arms of the base section are located beneath the sensors. The structural material may then be etched to form a base section corresponding in shape to the mask, and the mask may then be removed from the base section. An arm section may then be affixed to the base section, such as by spot welding to the base section at tabs that extend from the hinge arms of the base section. A head suspension assembly may then be affixed to the arm section, such as by spot welding to a distal end of the arm section.

DESCRIPTION OF EMBODIMENTS

Figure 1:
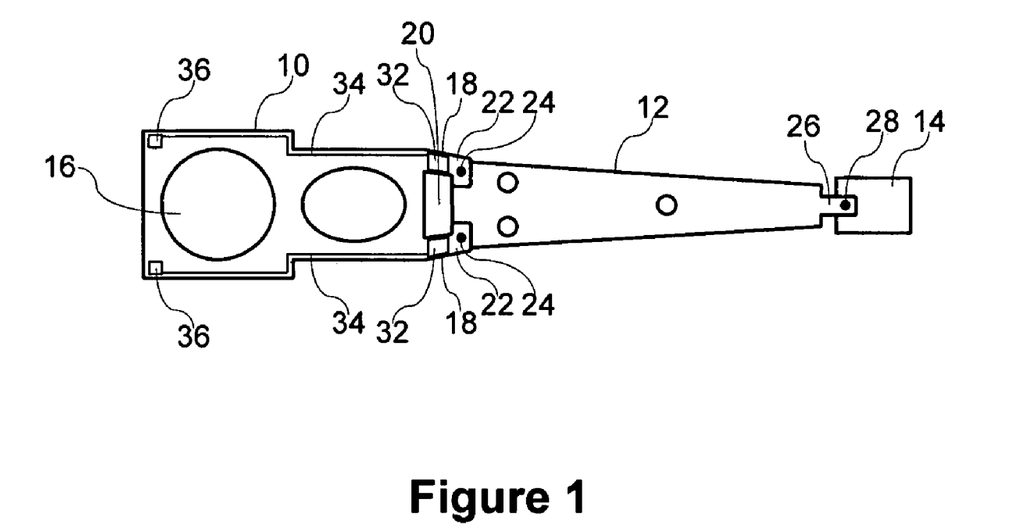
FIG. 1 shows a load beam in accordance with an embodiment.

In accordance with one embodiment, a load beam is comprised of a base section, an arm section and a head suspension assembly that are fabricated separately and joined to form a load beam. FIG. 1 shows an example of such a load beam. The load beam is comprised of a base section 10, an arm section 12, and a head suspension assembly 14. Each section is made of steel or another material having appropriate strength and workability. The base section 10 is mountable to an actuator arm of a hard disk drive voice coil motor, and is provided with an opening 16 for receiving a spindle of the voice coil motor. At a distal end, the base section 10 has a pair of hinge arms 18 separated by an opening 20. The width of the opening is chosen to provide a desired spring factor for the hinge arms 18. At the end of the hinge arms 18 are tabs 22 that serve as welding points for spot welds 24 that join the arm section 12 to the base section 10. The arm section 12 has a tab 26 at its distal end that serves as a welding point for a spot weld 28 that joins the head suspension assembly 14 to the arm section 12. The head suspension assembly 14 may be implemented in any manner. Examples of head suspension assemblies are provided, for example, in U.S. Pat. Nos. 6,738,229 and 6,938,326.

Figure 2:
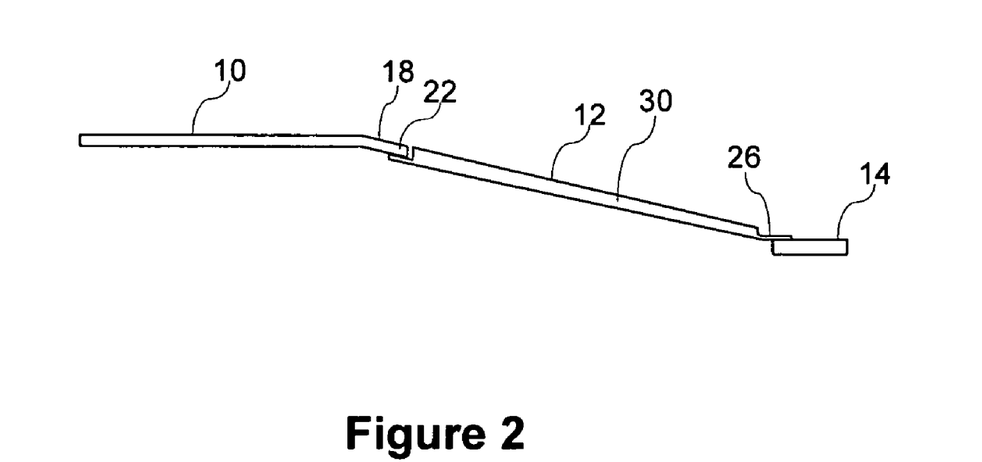
FIG. 2 shows a side view of the load beam of FIG. 1.

FIG. 2 shows a side view of the assembled load beam of FIG. 1. The base section 10 of the load beam is arranged in an overlapping fashion with the arm section 12 in the region of the hinge arms 18 and tabs 22, where the arm section 12 is spot welded or otherwise affixed to the base section 10. Similarly, the arm section 12 is arranged in an overlapping fashion with the head suspension assembly 14 in the region of the tab 26, where the head suspension assembly 14 is spot welded or otherwise affixed to the arm section 12.

As further shown in FIG. 2, the hinge arms 18 of the base section 10 are bent downward to pre-load or bias the arm section 12 in the direction of a disk surface with which the load beam will be associated. Similarly, the tab 26 of the arm section 12 may be bent upward to be substantially parallel to a disk surface with which the load beam will be associated and to thereby provide a substantially parallel alignment of the head suspension assembly 14 to the disk surface. Alternatively, the tab 26 of the arm section 12 may be unbent and a spring or gimbal structure of the head suspension assembly 14 may compensate for an angle of the arm section 12 relative to the disk surface.

As further shown in FIG. 2, the arm section 12 may have rails 30 extending upward at its outer edges. Such rails 30 may be formed by bending the outer edges of the arm section upward prior to assembly. Rails 30 provide added rigidity to the load beam. Additional information about rails of this type may be found in U.S. Pat. No. 6,938,326.

As shown in FIG. 1, the load beam further includes sensors 32 provided on the surface of the hinge arms 18. Conductive traces 34 connect the sensors 32 to conductive pads 36 that serve as mounting points for wires that conduct signals from the sensors 32 to inputs of a servo control system. The sensors 32 are preferably comprised of a piezoelectric polymer such as a polyvinylidene fluoride (PVDF) film that is formed directly on the surface of the steel base section, and a self-aligned electrode that is formed on the PVDF film. In this arrangement, the conductive steel base section serves as a first electrode for the PVDF sensor, and the overlying electrode and conductive trace serve as a second electrode and signal path for conducting a signal generated by the PVDF film to the control system. In alternative embodiments, an insulated lower electrode and conductive trace may be provided between the PVDF film and the base section 10. The hinge arms 18 will be a point of high strain during operation of a disk drive that incorporates the load beam, and the strain will reflect the resonant modes of the load beam. Consequently the signal generated by sensors 32 will reflect deformations of the load beam and will allow the control system to provide control signals to the voice coil motor and microactuator to counteract the deformations and provide more accurate tracking of tracks on the disk surface.

Figure 3:
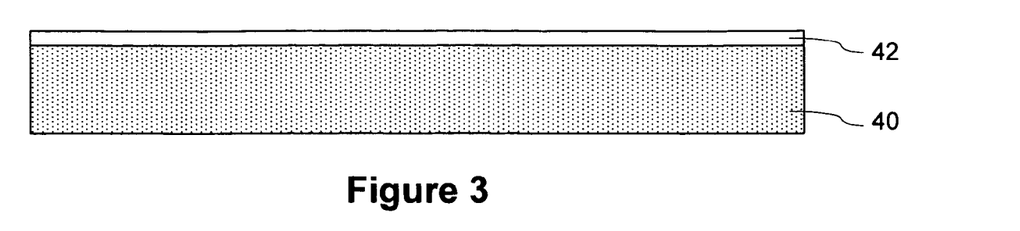
FIG. 3 shows a laminated structure comprised of a sheet of steel and a polyvinylidene fluoride (PVDF) film.

A load beam as shown in FIG. 1 can be fabricated in a variety of manners. Structures formed during fabrication in accordance with one embodiment of a fabrication process are shown in FIGS. 3-9. FIG. 3 shows a sectional view of a substrate comprised of a structural material 40 and a sensor material 42. The structural material 40 is preferably a steel sheet of the type typically used in the formation of load beams. The sensor material is preferably PVDF or another piezoelectric polymer film. The PVDF film 42 is laminated onto the steel sheet 40 and adhered to the steel sheet 40 using typical means such as a heat sealing process or an adhesive material. To provide piezoelectric properties, the PVDF film must have a tensile strain applied thereto, and so the lamination is performed in a fashion that yields a substrate comprised of strained layer of PVDF 42 adhered to the steel sheet 40.

Figure 4:
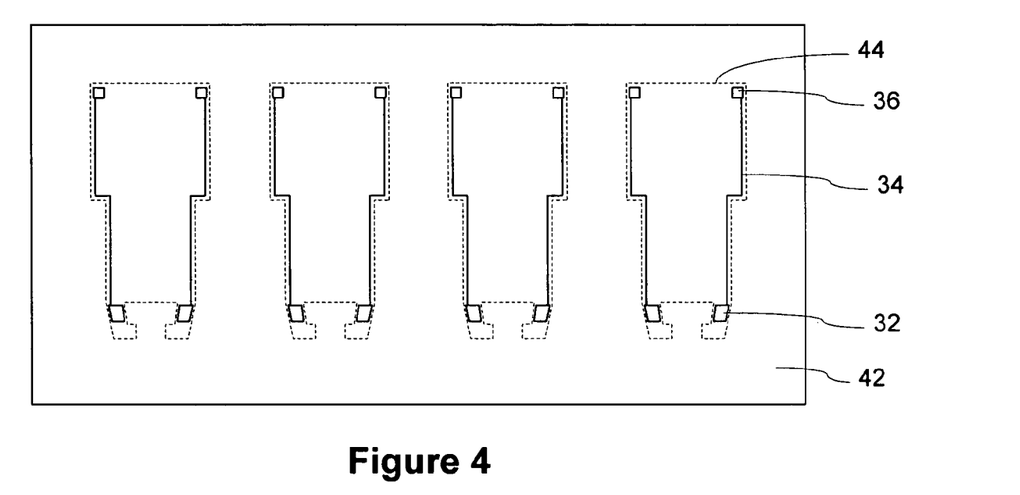
FIG. 4 shows the surface of the structure of FIG. 3 after formation of conductive structures on the PVDF film.

FIG. 4 shows the surface of the laminate structure of FIG. 3 from above after formation of electrodes 32, conductive traces 34, and conductive pads 36 on the PVDF film 42. The electrodes 32, conductive traces 34 and conductive pads 36 are placed in locations where base sections will subsequently be formed, so as to be appropriately located on the resulting base sections. Base sections to be subsequently formed are indicated by broken lines 44. The electrodes 32, conductive traces 34 and conductive pads 36 may be formed in a variety of manners, such as by printing using a conductive ink compound, by sputtering through a shadow mask, or by bulk deposition of conductive material followed by masking of conductive material in desired regions and selective etching of exposed conductive material. As shown in FIG. 4, it is preferable to fabricate multiple base sections from a laminate substrate.

Figure 5:
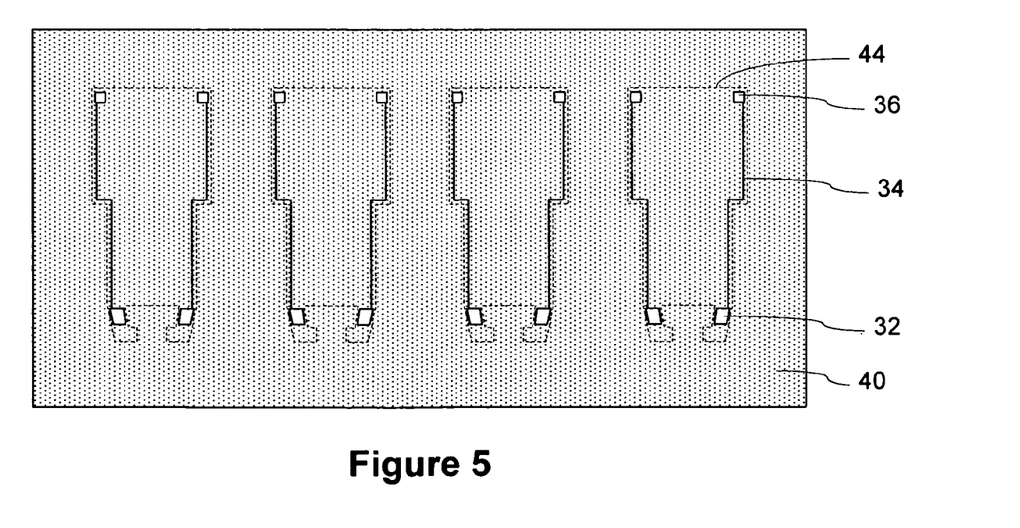
FIG. 5 shows the structure of FIG. 4 after removal of PVDF film in areas unprotected by the conductive structures.

FIG. 5 shows the structure of FIG. 4 after further processing to remove the PVDF film in areas outside of the regions underlying the patterned conductive material. This may be accomplished by chemical etching of the PVDF film. Etching may be performed using an etchant that is highly selective of the PVDF film relative to the conductive material, which allows the conductive materials to be used as a mask that yields PVDF structures that are self-aligned to the overlying conductive structures. Alternatively, the conductive structures may be masked prior to etching of the PVDF material.

Figure 6:
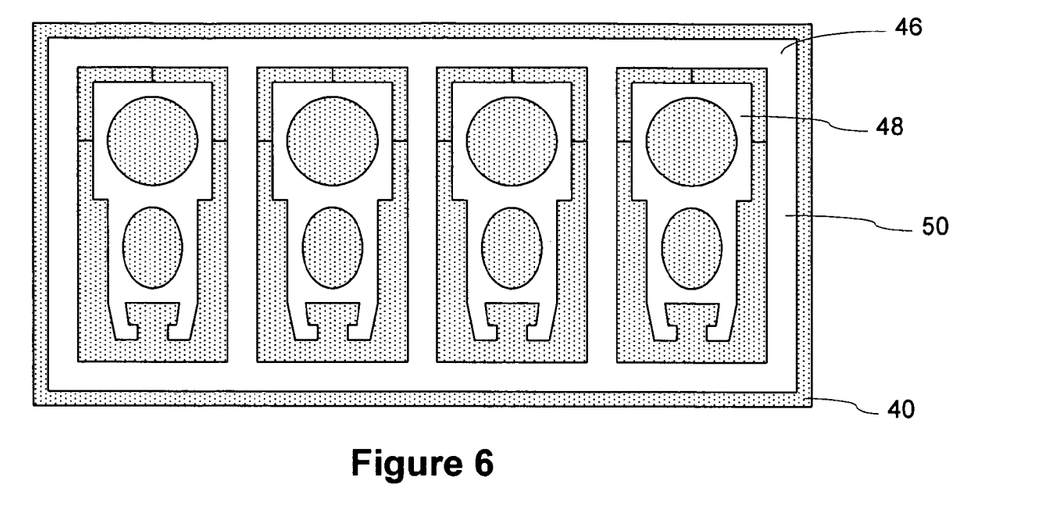
FIG. 6 shows the structure of FIG. 5 after application of a mask that defines base sections and a surrounding frame.

FIG. 6 shows the structure of FIG. 5 after application of a mask 46. The mask 46 defines base sections 48 and a surrounding frame 50 that retains the individual base sections 48 in place after surrounding steel has been removed. The mask 46 covers the conductive materials previously formed over the substrate and the underlying patterned PVDF. The mask 46 may also be formed over any masking material that remains from patterning of the conductive material or PVDF film, or may be formed after removal of such masking material.

Figure 7:
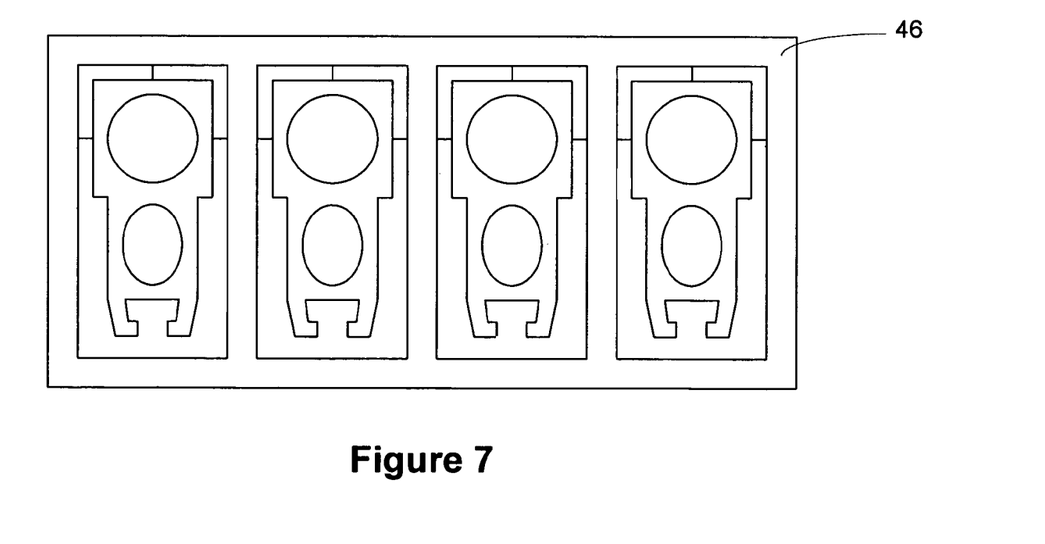
FIG. 7 shows the structure of FIG. 6 after selective etching to remove steel material unprotected by the mask.

FIG. 7 shows the structure of FIG. 6 after etching of the structure of FIG. 6 in an etchant that is highly selective of the steel substrate relative to the overlying masking material. The resulting structure leaves the mask 46 in place over un-etched steel, with unmasked steel having been removed by the etchant. The mask 46 may be structured to be slightly larger than the final desired shape of the base section to compensate for undercutting that will occur at sidewalls of the base section that are exposed during etching.

Figure 8:
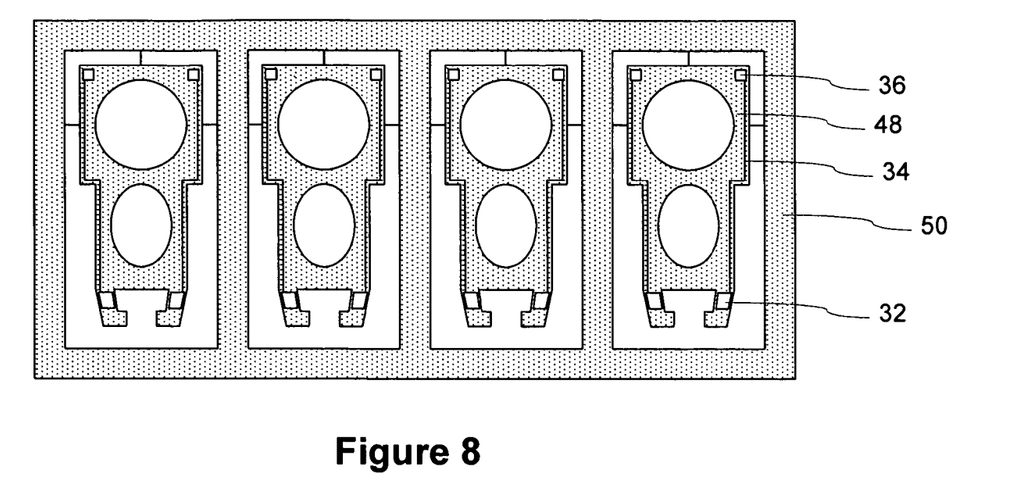
FIG. 8 shows the structure of FIG. 7 after removal of the mask.

FIG. 8 shows the structure of FIG. 7 after removal of the mask material to expose fabricated steel base sections 10 and a surrounding frame 50 to which the base sections 10 remain attached via minute tabs that allow each base section 10 to be easily broken free from the frame 50 when needed for fabrication of a load beam.

The structures formed in FIGS. 3-8 may be formed using well-known masking and etching materials, and masking, etching and mask removal techniques.

Figure 9:
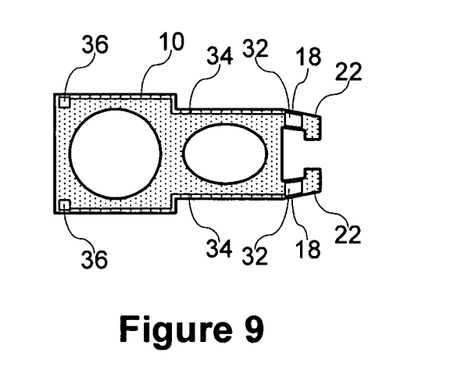
FIG. 9 shows an individual base section after removal from the structure of FIG. 8.

FIG. 9 shows a single base section 10 after being broken from the frame of FIG. 8. The base section has hinge arms 18 with tabs 22 to which an arm section may be fixed. Sensors 32, conductive traces 34 and conductive pads 36 are preformed on the base section 10 for connection to a servo control system.

Figure 10:
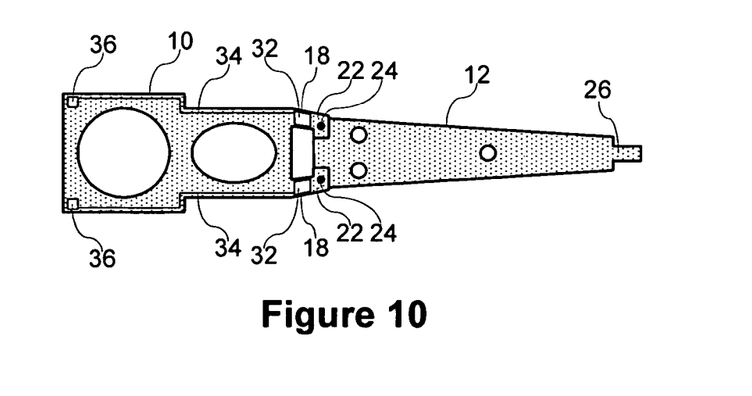
FIG. 10 shows an arm section joined to the base section of FIG. 9.

FIG. 10 shows the base section 10 of FIG. 9 after an arm section 12 has been affixed to the base section 10 at the tabs 22. The arm section 12 is preferably affixed to the base section 10 by spot welding. The arm section 12 is preferably formed from the same material as the base section 10 and may be fabricated using an etching, stamping or cutting process. Ant bending of the hinge arms 18 of the base section 10 may be performed before or after joining to the arm section 12.

Figure 11:
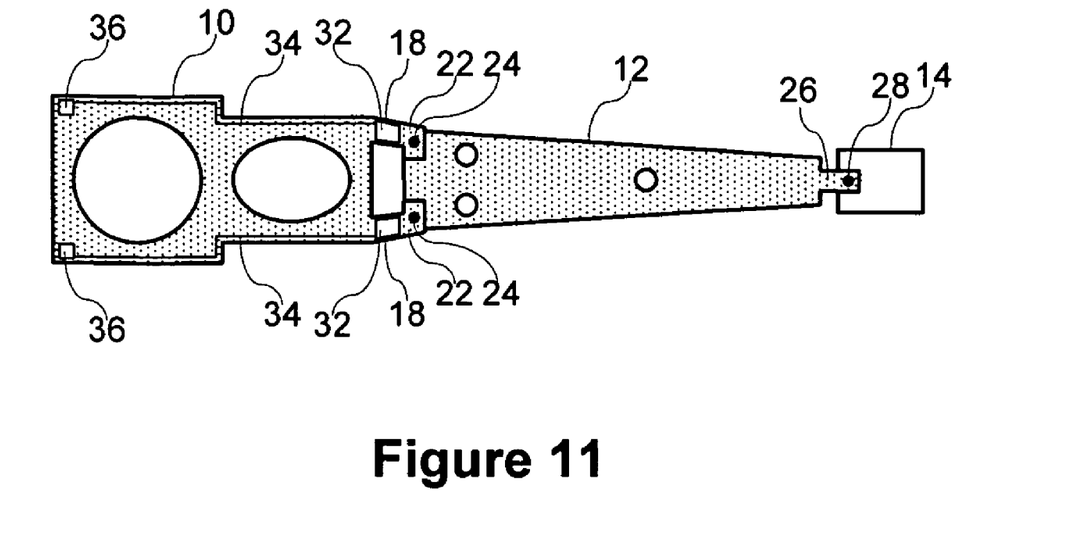
FIG. 11 shows a head suspension assembly joined to the arm section and base section of FIG. 10.

FIG. 11 shows the base section 10 and arm section 12 of FIG. 10 after a head suspension assembly 14 has been affixed to the tab 26 at the distal end of the arm section 12. The head suspension assembly 14 is preferably affixed to the arm section 12 by spot welding. Any bending of the tab 26 of the arm section 12 may be performed before or after joining to the head suspension assembly 14.

Figure 12:
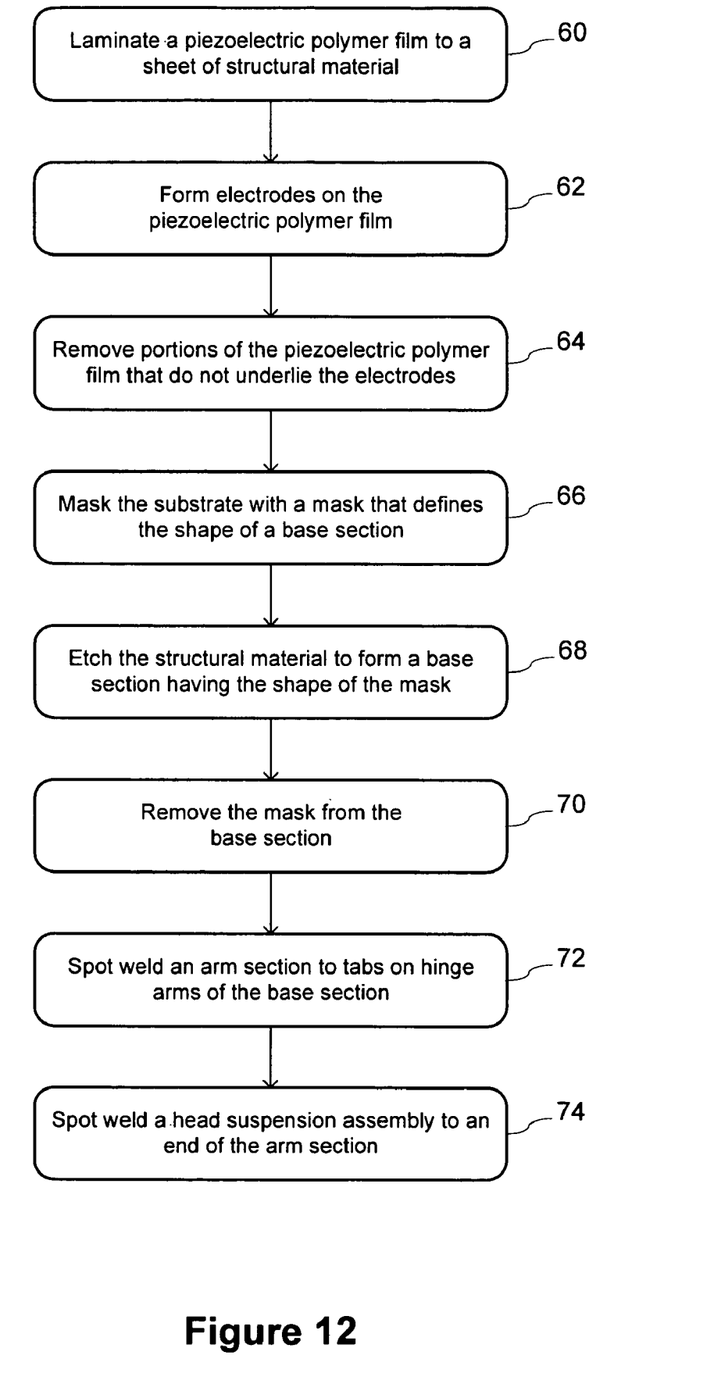
FIG. 12 shows a process flow for formation of a load beam in accordance with an embodiment of the invention.

FIG. 12 shows a process flow for the formation of a load beam as shown in FIG. 11. Initially a substrate is formed by laminating a piezoelectric polymer film such as a polyvinylidene fluoride (PVDF) film to the surface of a sheet of a structural material such as steel (60). Sensors are then formed on the substrate. Sensors may be formed by forming electrodes on the piezoelectric polymer film (62), such as by printing a conductive ink on the piezoelectric polymer film, and then removing portions of the piezoelectric polymer film that do not underlie that electrodes (64), such as by etching to remove portions of the piezoelectric polymer film using the electrodes as etch masks. The resulting sensors comprise electrodes overlying portions of the piezoelectric polymer film. Base sections are then formed from the substrate. Base sections may be formed by masking the sensors and portions of the substrate with a mask that defines the shape of a base section (66), such that hinge arms of the base section are located beneath the sensors. The structural material is then etched to form a base section corresponding in shape to the mask (68), and the mask is then removed from the base section (70). An arm section is then spot welded to the base section at tabs that extend from the hinge arms of the base section (72). A head suspension assembly is then spot welded to a distal end of the arm section (74). The resulting structure may take the form of the load arm shown in FIG. 11. Of course, additional fabrication tasks may be performed prior to, during and after the tasks shown and described with respect to FIG. 12.

Figure 13:
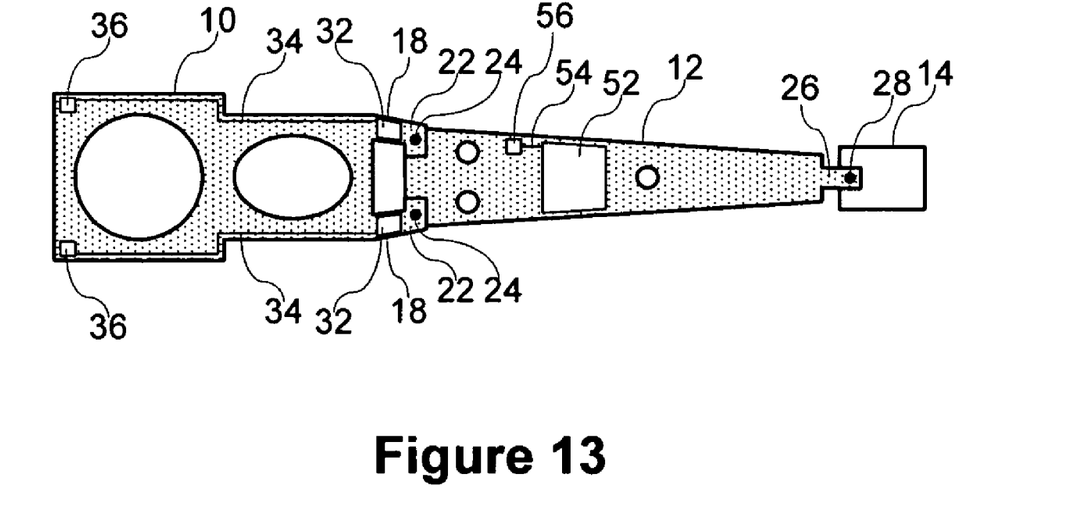
FIG. 13 shows a load beam in accordance with an alternative embodiment.

FIG. 13 shows an alternative embodiment in which a further sensor 52 is provided on the arm section 12 of the load beam. The sensor 52 is preferably a piezoelectric polymer sensor such as the PVDF sensor described in the previous embodiment. The sensor 52 is connected via a conductive trace 54 to a conductive pad 56 to which wiring may be connected to provide a signal from the sensor 52 to the servo control system of the disk drive. The arm sensor 52, conductive trace 54 and conductive pad 56 may be fabricated in a manner similar to the sensors 32, conductive trace 34 and conductive pad 36 of the base section 10 using masking and selective etching to shape a piezoelectric polymer film and using printing or another deposition process to form conductive elements. Accordingly, an arm section 12 as shown in FIG. 13 may be fabricated in a manner similar to that of the base section 10 described above, wherein sensors and associated elements are formed on a steel sheet, and arm sections 12 are then formed from the steel sheet using masking and selective etching to produce arm sections 12 having the preformed sensors in desired locations. Further processing such as bending of the side portions of the arm sections 12 to form rails may be performed before assembling the arm sections 12 to base sections 10 such as by spot welding.

The structures, devices, features and processes described herein are not exclusive of other structures, devices, features and processes, and variations and additions may be implemented in accordance with the particular objectives to be achieved. For example, structures as described herein may be integrated with other structures not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

What is claimed is:

1. A load arm for a disk drive comprising:
    a base section having hinge arms terminating in tabs;
    an arm section affixed to the tabs of the hinge arms of the base section;

a head suspension assembly affixed to a distal end of the arm section; and a sensor formed on a selected hinge arm of the base section adapted to provide a strain measurement signal responsive to mechanical deflection of the selected hinge arm, the base section and the selected hinge arm being electrically conductive to form a first signal path for the sensor, the sensor being formed of a continuously extending first layer of piezoelectric polymer sensing material which extends along the base section, and an electrode being formed as a continuously extending second layer of conductive material that contactingly extends along the first layer to provide a second signal path for the sensor.

2. The load arm claimed in claim 1, wherein the hinge arms comprise first and second arms which extend in spaced apart relation from the base section, the sensor is characterized as a first sensor attached to the first arm, and the load arm further comprises a second sensor nominally identical to the first sensor and attached to the second arm.

3. The load arm claimed in claim 1, wherein the sensor is formed from a single piezoelectric polymer sensing layer which extends in contacting abutment against a selected surface of the selected hinge arm along an entire length of the sensor.

4. The load arm claimed in claim 1, wherein the hinge arms provide a point of relatively high strain in relation to remaining portions of the load arm so that the sensor detects resonant modes of the load beam responsive to said deflection.

5. The load arm claimed in claim 1, wherein the base section comprises a base plate portion that extends along a first plane, the hinge arms extend from the base plate portion at a second plane non-normal to the first plane, and the base plate portion comprises an opening for receiving a spindle of a voice coil motor.

6. A method of forming a load arm for a disk drive comprising:
providing a substrate comprising a sheet of a structural material and a piezoelectric polymer film formed on a surface of the structural material;
forming sensors on the structural material, the sensors comprising electrodes overlying portions of the piezoelectric polymer film;
masking said sensors and portions of the substrate with a mask defining a base section of a load arm, the mask defining hinge arms of the base section beneath said sensors, the base section being electrically conductive to form a first signal path for the sensor, the electrode providing a second signal path that continuously extends along the piezoelectric polymer film;
etching the structural material to form a base section corresponding in shape to the mask;
removing the mask from the base section;
affixing an arm section to the base section at tabs extending from the hinge arms of the base section; and
affixing a head suspension assembly to a distal end of the arm section.

7. The method claimed in claim 6, wherein providing a substrate comprises laminating a polyvinylidene fluoride (PVDF) film to a sheet of steel.

8. The method claimed in claim 7, wherein forming sensors comprises:

forming electrodes on the PVDF film; and
etching to remove portions of the PVDF film using the electrodes as etch masks.

9. The method claimed in claim 8, wherein the electrodes are formed by printing a conductive ink on the PVDF film.

10. The method claimed in claim 7, wherein forming sensors comprises:
forming electrodes on the PVDF film;
forming a mask over the PBDF film and the electrodes, the mask defining shapes of the sensors; and
etching to remove portions of the PVDF film unprotected by the mask.

11. The method claimed in claim 10, wherein the mask defining a base section is formed over the mask defining shapes of the sensors after etching to remove portions of the PVDF film.

12. The method claimed in claim 10, wherein the mask defining shapes of the sensors is removed after etching to remove portions of the PBDF film and before forming the mask defining a base section.

13. The method claimed in claim 7, wherein forming sensors comprises forming conductive structures on the PVDF film, the conductive structures comprising sensor electrodes, conductive pads, and conductive traces connecting the sensor electrodes to the conductive pads.

14. The method claimed in claim 13, wherein the sensor electrodes, conductive pads, and conductive traces are formed by printing a conductive ink on the PVDF film.

15. The method claimed in claim 6, wherein affixing the arm section is preceded by bending the hinge arms.

16. The method claimed in claim 6, wherein affixing the arm section is followed by bending the hinge arms.

17. The method claimed in claim 6, wherein the arm section comprises spot welding an end of the arm section to the tabs of the hinge arms of the base section.

18. An apparatus comprising:
a base section comprising a base plate portion extending along a first plane and spaced apart first and second hinge arms which linearly extend from the base plate portion along a second plane non-normal to the first plane;
an arm section connected to the first and second hinge arms and extending along said second plane; and
a continuous layer of piezoelectric material which contactingly extends along the base plate portion and a selected one of the first or second hinge arms, a distal end of said layer of piezoelectric material adapted to generate a strain measurement signal responsive to mechanical deflection of the selected hinge arm, the base section and the selected hinge arm being electrically conductive to form a first signal path for the sensor, the sensor being formed of a continuously extending first layer of piezoelectric polymer sensing material which extends along the base section, and an electrode being formed as a continuously extending second layer of conductive material that contactingly extends along the first layer to provide a second signal path for the sensor.

19. The apparatus of claim 18, further comprising a continuous layer of conductive material which contactingly extends along the layer of piezoelectric material to conduct said strain measurement signal.

* * * * *